(12) United States Patent
Immaneni et al.

(10) Patent No.: US 9,292,156 B2
(45) Date of Patent: Mar. 22, 2016

(54) ENABLING A USER TO INVOKE A FUNCTION VIA A SHORTCUT KEY IN A MULTI-WINDOW COMPUTING ENVIRONMENT

(75) Inventors: Pavan K. Immaneni, San Jose, CA (US); Steven Ma, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 839 days.

(21) Appl. No.: 13/346,047

(22) Filed: Jan. 9, 2012

(65) Prior Publication Data

US 2013/0179814 A1 Jul. 11, 2013

(51) Int. Cl.
*G06F 3/0481* (2013.01)
*G06F 3/0489* (2013.01)

(52) U.S. Cl.
CPC ............ *G06F 3/0481* (2013.01); *G06F 3/0489* (2013.01)

(58) Field of Classification Search
USPC .................................................. 715/827, 847
See application file for complete search history.

(56) References Cited

U.S. PATENT DOCUMENTS

| 5,973,688 | A | 10/1999 | May | |
|---|---|---|---|---|
| 6,114,978 | A * | 9/2000 | Hoag | 341/23 |
| 6,934,778 | B2 * | 8/2005 | Numano | 710/67 |
| 6,959,422 | B2 | 10/2005 | Slaunwhite | |
| 7,134,094 | B2 | 11/2006 | Stabb et al. | |
| 2004/0246823 | A1 * | 12/2004 | Kwon | 369/24.01 |
| 2004/0263480 | A1 * | 12/2004 | Pagan | 345/172 |
| 2005/0055647 | A1 * | 3/2005 | Chen | 715/827 |
| 2010/0064077 | A1 | 3/2010 | Chung | |
| 2010/0122213 | A1 | 5/2010 | Chen | |
| 2010/0287498 | A1 | 11/2010 | Palgon et al. | |
| 2010/0287507 | A1 | 11/2010 | Paquette | |
| 2012/0244876 | A1 * | 9/2012 | Park et al. | 455/456.1 |

* cited by examiner

*Primary Examiner* — Tuyetlien T Tran
*Assistant Examiner* — David S Posigian
(74) *Attorney, Agent, or Firm* — Convergent Law Group LLP

(57) ABSTRACT

Exemplary embodiments disclose enabling a user to invoke a function via a shortcut key in a multi-window computing environment by a software component executing on the computer. The exemplary embodiments include displaying, by a software component executing on a processor of a computer, a menu that lists functions invoked in different windows by the shortcut key; receiving a user entered selection of a priority for each of the functions to create a ranked menu of functions for the shortcut key; and responsive to detecting an entering of the shortcut key via a keyboard by a user, selectively invoking one of functions listed in the shortcut key menu regardless of which window is currently active based on the priority of the functions and a number of times the shortcut key is entered.

8 Claims, 7 Drawing Sheets

ENABLING A USER TO INVOKE A FUNCTION VIA A SHORTCUT KEY IN A MULTI-WINDOW COMPUTING ENVIRONMENT

BACKGROUND

Examples of multi-window graphical user interface environments include Microsoft Windows, Apple Mac OS and, an open source integrated development environments (IDEs) such as Eclipse Workbench, Oracle/Sun's Netbeens and Microsoft.Net. In Eclipse Workbench, for example, features and functionality are typically delivered via individual windows, or a collection of these windows, known as views. A Project Explorer, for example, is a view where a user can interact with Eclipse projects containing application codes; a Problems view is one where a user can use to inspect and review program error messages; and a Properties view allows one to inspect the attributes of a selected object from the Eclipse Workbench. Using Windows/views like these together provide a flexible and powerful set of functions to enable its user to work productively in a modern tool environment.

While multi-window environments are powerful, they are not without usability shortcomings. One such usability shortcoming, for example, is the support for keyboard shortcuts (also known as "key binding" in Eclipse Workbench). In short, unless a shortcut key for a function has its context set to the entire workbench level (this is both unusual and discouraged except for native Eclipse Workbench functionality), a shortcut key bound to a given function is only applicable to the very same view in which the short key is defined. In other words, the shortcut key for "Function A" is only enabled when the window/view containing "Function A" is currently in focus (i.e., active). The exact same shortcut key binding, if exists, can have a completely different behavior if invoked while another window or view is selected. In the latter case - pressing the shortcut key for "Function A" while another window/view is selected—may not invoke "Function A", but rather "Function X".

Usability wise, this is problematic for a user since invoking the desired function would require a user to first highlight the correct window/view (or make sure its the current window/view), and then invoke the desired shortcut key. The extra effort required to accomplish such tasks diminishes the convenience and ease of use intended by the provision of shortcut keys in the first place.

Accordingly, a need exists for an improved method and system for enabling a user to invoke a function via its defined shortcut key, regardless of which view is active. This would allow the user to focus on his/her task and work more productively.

BRIEF SUMMARY

Exemplary embodiments disclose enabling a user to invoke a function via a shortcut key in a multi-window computing environment by a software component executing on the computer. The exemplary embodiments include displaying, by a software component executing on a processor of a computer, a menu that lists functions invoked in different windows by the shortcut key; receiving a user entered selection of a priority for each of the functions to create a ranked menu of functions for the shortcut key; and responsive to detecting an entering of the shortcut key via a keyboard by a user, selectively invoking one of functions listed in the shortcut key menu regardless of which window is currently active based on the priority of the functions and a number of times the shortcut key is entered.

DETAILED DESCRIPTION

The exemplary embodiment relates to methods for enabling a user to invoke a function via its defined shortcut key. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Figure 1:
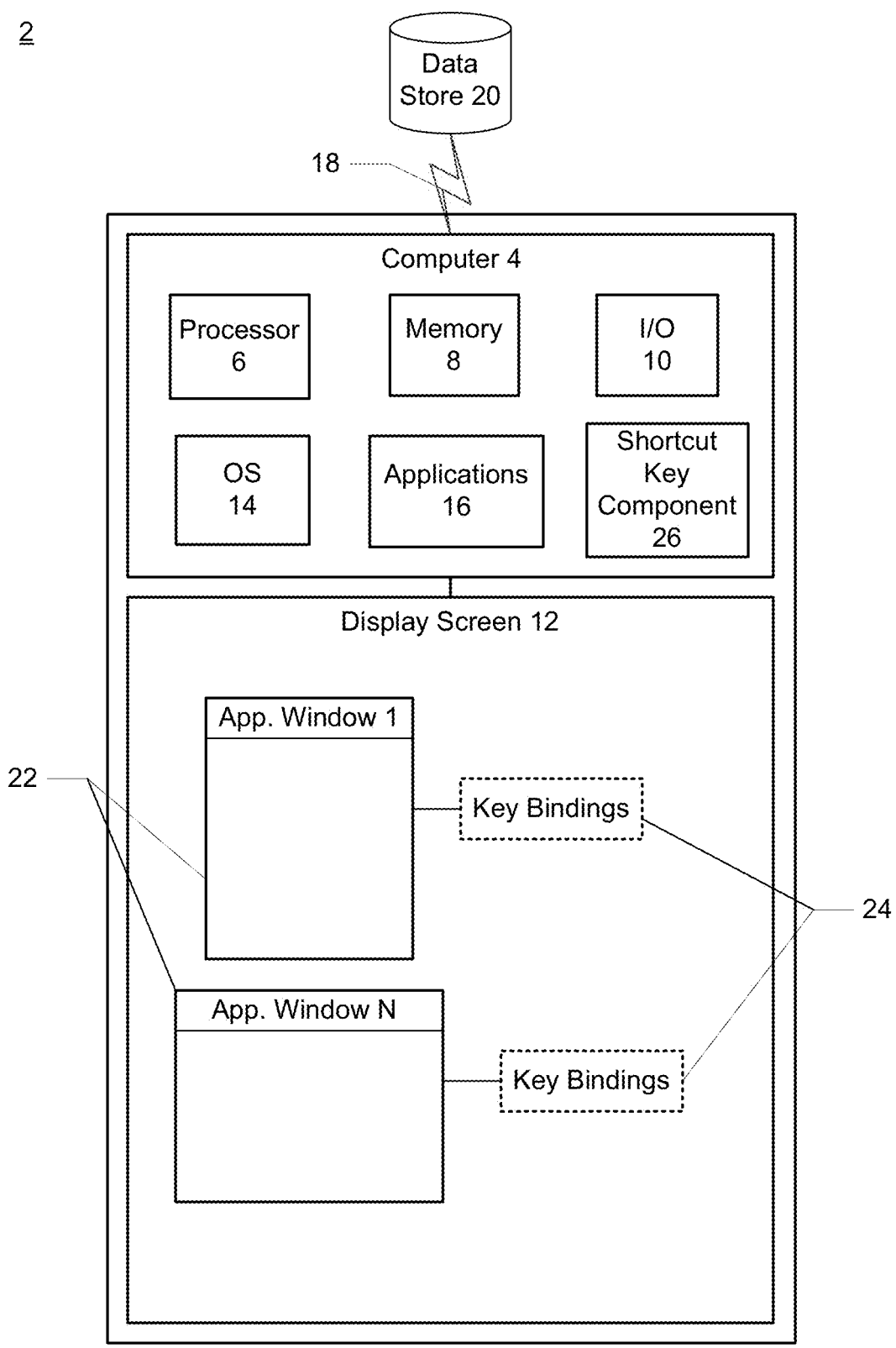
FIG. 1 is a logical block diagram illustrating an exemplary embodiment for enabling a user to invoke a function via its defined shortcut key.

FIG. 1 is a logical block diagram illustrating an exemplary embodiment for enabling a user to invoke a function via its defined shortcut key. The system 2 includes a computer 4 having at least one processor 6, a memory 8, an input/output (I/O) 10, and a display screen 12 coupled together via a system bus (not shown). The computer 4 may exist in various forms, including a smart or mobile phone, a tablet computer, a personal computer (PC), (e.g., desktop, laptop, or notebook), a personal digital assistant (PDA), a set-top box, a game system, and the like. In some embodiments, the computer 4 may be configured as a server. The computer 4 may include other hardware components of typical computing devices (not shown), including input devices (e.g., keyboard, pointing device, microphone for voice commands, buttons, touch screen, etc.), and output devices (e.g., speakers, and the like). The computer 4 may include computer-readable media, e.g., memory and storage devices (e.g., flash memory, hard drive, optical disk drive, magnetic disk drive, and the like) containing computer instructions that implement the functionality disclosed when executed by the processor. The computer 4 may further include wired or wireless network communication interfaces for communication.

The processor 6 may be part of data processing system suitable for storing and/or executing software code including an operating system (OS) 14, and various applications (e.g., a web browser, a word processor, and the like). As used herein, an application may also include an integrated development environment (IDE). The processor 6 may be coupled directly or indirectly to elements of the memory 8 through a system bus (not shown). The memory elements can include local memory employed during actual execution of the program code, bulk storage, and cache memories which provide temporary storage of at least some program code in order to reduce the number of times code must be retrieved from bulk storage during execution.

The input/output 10 or I/O devices (including but not limited to sensors, keyboards, external displays, pointing devices, etc.) can be coupled to the system either directly or through intervening I/O controllers. Network adapters (not shown) may also be coupled to the system. Modems, cable modems and Ethernet cards are just a few of the currently available types of network adapters. The network adapters enable the data processing system to become coupled to other data processing systems, including remote printers or storage devices through intervening private or public networks 18. For example, the computer 4 may be coupled to a remote data store 20.

The operating system 14, as well as applications 16, such as an IDE, are each capable of displaying windows 22. In a multi-window environment, each application 16 is typically displayed in its own window, while an IDE displays may multiple views. As used herein, the term window 22 is meant to include a view. Each window 22 may include its own shortcut key bindings 24, where each shortcut key binding identifies a shortcut key and a function or command assigned to the shortcut key. Multiple windows may displayed at one time and may overlap or cover one another. However, the window that is displayed on top is typically the active, in focus window. Different applications 16 may use the same shortcut key (e.g., CTRL+R), but have different functions assigned to the shortcut key. Pressing a shortcut key typically only invokes the function defined in the shortcut key binding 24 for the active window.

As an example of a multi-window environment, consider the context of a debugging task for an application developer using an IBM product, Rational Developer for Systemz (RDz), that provides a set of functionality via Eclipse plugins, running on top of the Eclipse platform. Assume in this example that a developer is currently debugging an application using RDz.

Figure 2:
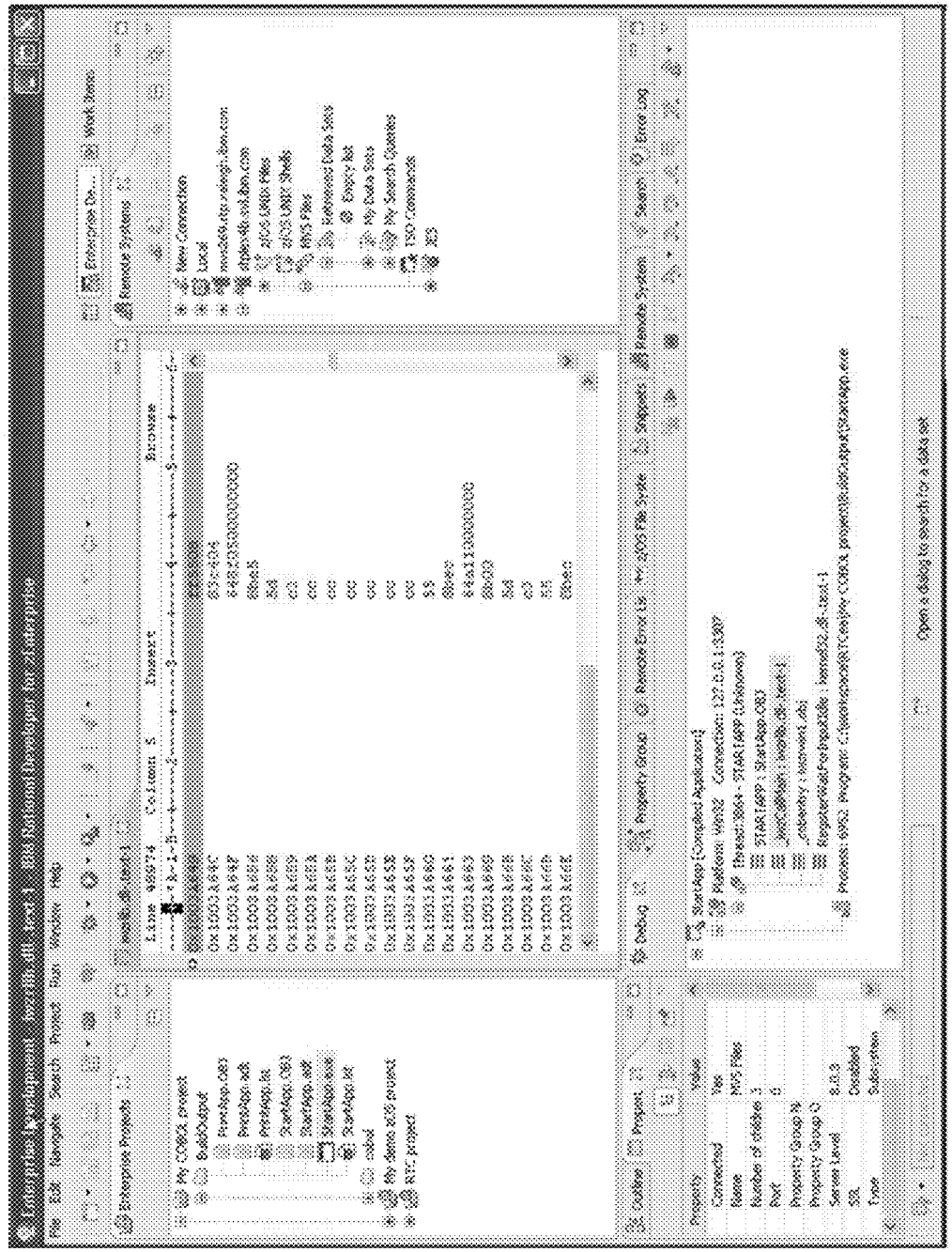
FIG. 2 is a diagram illustrating a conventional application running on the Eclipse workbench using Rational Developer for System z (RDz).

FIG. 2 is a diagram illustrating a conventional application running on the Eclipse workbench using RDz. The functions on the user interface are primarily delivered via Eclipse views, such as a Enterprise Projects view, a Remote Systems view, a Properties view, and a Debug view. In this illustration, an Editor (highlighted) is currently in focus, while other views such as the Enterprise Projects view and Remote Systems view provide the user access to his/her programs and other resources on different systems. While using the Editor, the user can invoke a set of editor-specific functionality for this particular task. Some of the more frequently performed tasks also have shortcut keys associated to them for ease of access.

Figure 3:
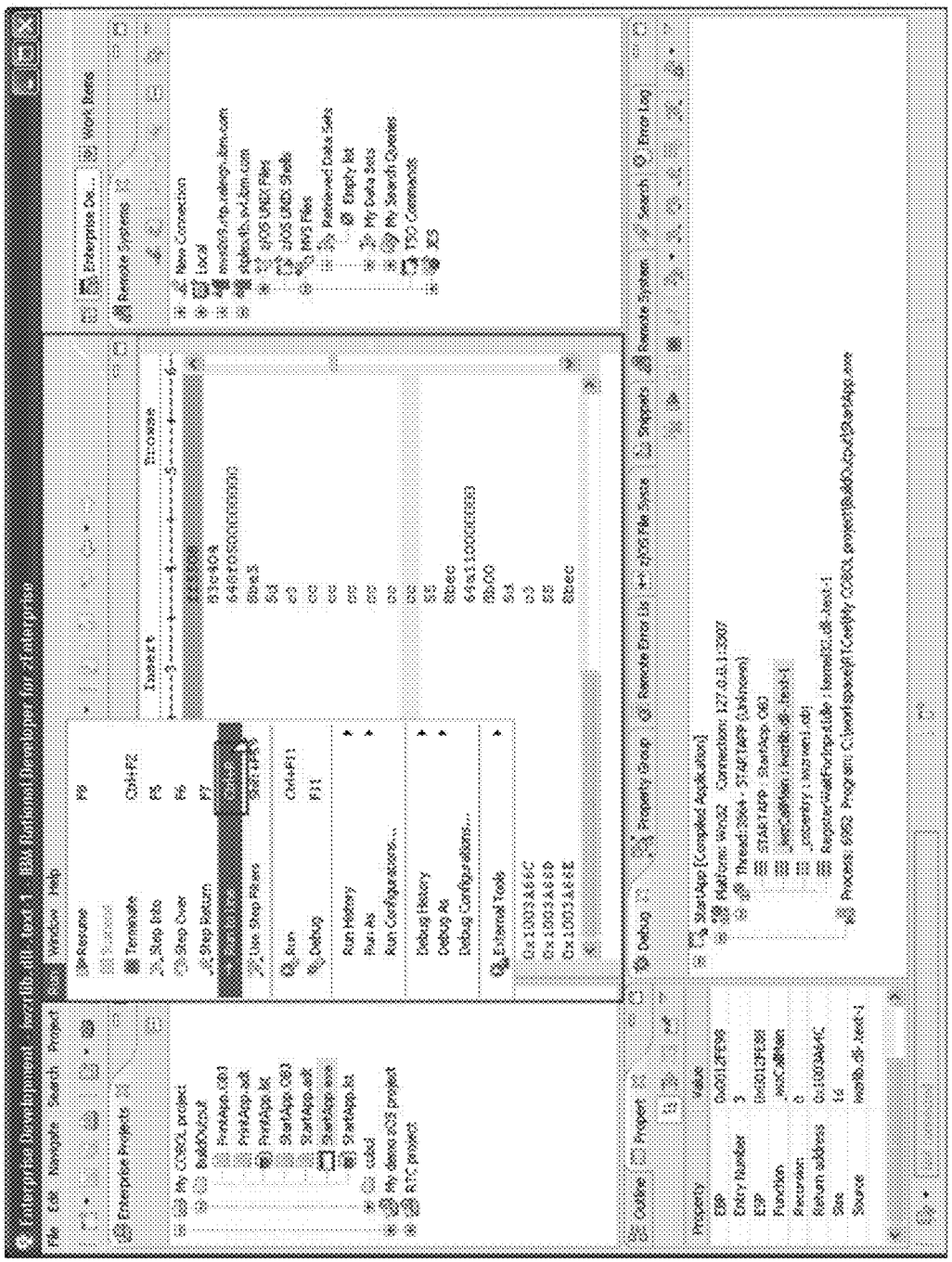
FIG. 3 is a diagram illustrating an available menu for the current debugging task.

FIG. 3 is a diagram illustrating an available menu for the current debugging task. In this scenario, the user is working in the editor, which has a set of functions that can be invoked by selecting the corresponding action via the context menu of this editor view. Many of these actions are also bound to a shortcut key. The menu of actions displays the shortcut keys that available to the user as long as the editor is in focus. For example, a user can press "CTRL+R" to invoke the function "Run to line" as he/she is debugging the code.

However, the user might also want to invoke another function from another view in the task of debugging, and not just those functions available to the editor. Using this same debugging example—a user might want to look up another program and compare its source code to the one being debugged. This can be accomplished in RDz using the "Retrieve Data Set" function available on the Remote Systems view. The invocation of the "Retrieve data set" function via the shortcut key, however, can only be done if the Remote Systems view is in focus, and not when the editor is in focus. This "Retrieve data set" function, incidentally, can also bound to the same shortcut key "CTRL+R", as illustrated in FIGS. 4 and 5.

Figure 4:
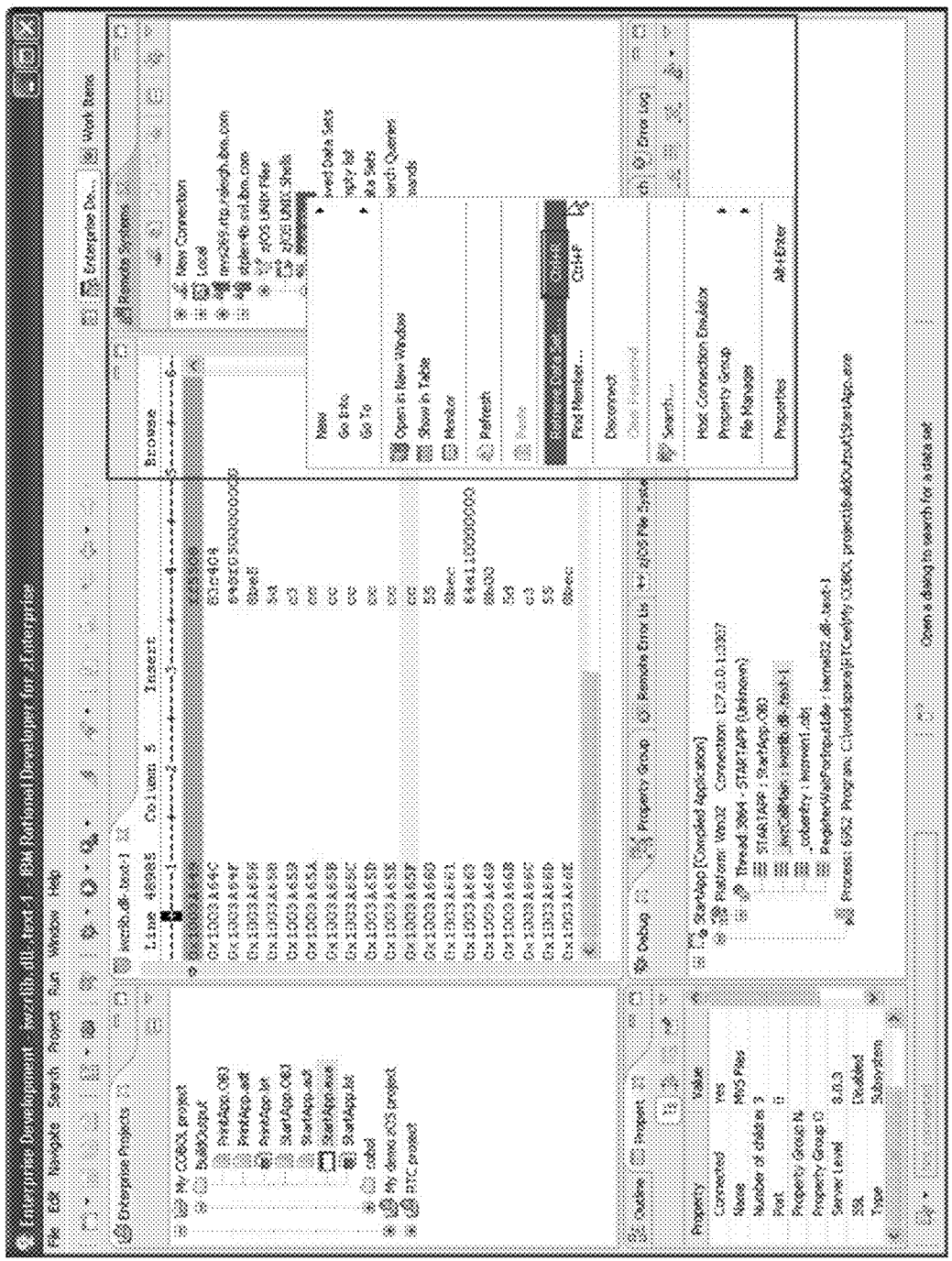
FIG. 4 is a diagram of the user interface of the same RDz workbench, showing a menu of options for the Remote Systems view, which is now active.
Figure 5:
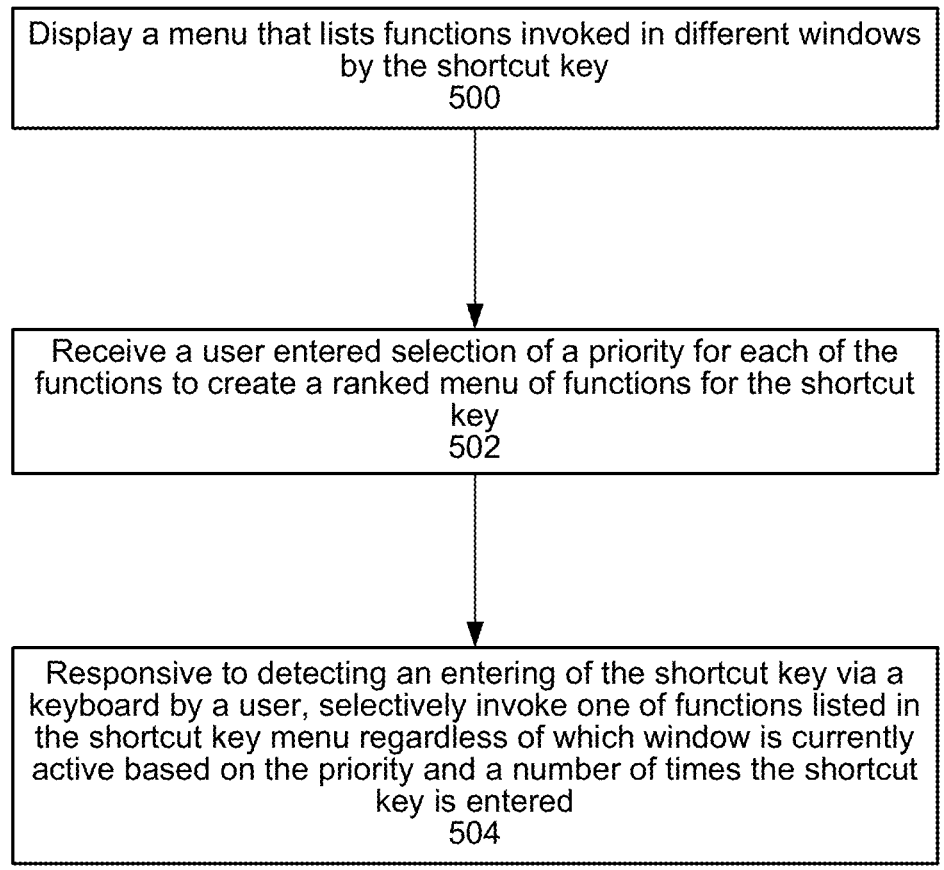
FIG. 5 is a flow diagram illustrating one embodiment of a process for enabling the user to invoke a function via the shortcut key.

FIG. 4 is a diagram of the user interface of the same RDz workbench, showing a menu of options for the Remote Systems view, which is now active. The function "Retrieve data set" for the Remote Systems view is also bound to the same shortcut key, "CTRL+R". As in other cases, the only way to invoke this "Retrieve data set" function via the "CTRL+R" shortcut key is when the Remote Systems view is in focus.

According to the exemplary embodiments, the above shortcut key usability problem is overcome by providing the computer 4 with a shortcut key component 26 that compiles a list shortcut keys and corresponding functions from the applications 16, including the OS 14 in one embodiment; and for a particular shortcut key, enables the user to add a priority to the functions mapped to that particular shortcut key across the applications 16, and to then invoke those functions regardless of which application is currently active.

In one embodiment, the shortcut key component 26 may be implemented as a standalone application that monitors and controls invocation of shortcut key functions. In another embodiment, the shortcut key component 26 may be implemented as part of the OS 14. Although the shortcut key component 26 is shown as a single component, the functionality of the shortcut key component 26 may be implemented using a greater number of modules/components.

FIG. 5 is a flow diagram illustrating one embodiment of a process for enabling the user to invoke a function via the shortcut key. The process is performed by a software component (e.g., the shortcut key component 26 or a combination of the OS 14 and the shortcut key component 26) executed by processor 6.

The process may begin by the software component displaying a menu that lists functions invoked in different windows by the shortcut key (block 500). In one embodiment, the shortcut key menu displays the shortcut key bindings 24 of the shortcut keys from the different applications 16 along with a respective priority attribute to enable users to pre-organize what functions to invoke and in what order when a particular shortcut key is pressed, regardless of the context as determined by the currently active or in focus window 22.

In one embodiment, all the shortcut key bindings 24 may be displayed in the shortcut key menu, while in alternative embodiment, only the functions mapped to the entered shortcut key are shown with their priority attributes.

In one embodiment, the shortcut key component 26 may create the shortcut key menu. In another embodiment, the shortcut key component 26 may append the priority attribute to an existing short key menu of an application or IDE. The shortcut key component 26 may periodically search a registry of the computer 4 for existing shortcut key bindings 24 and dynamically create or modify the shortcut key menu by adding any of shortcut key bindings 24 that were found.

Figure 6:
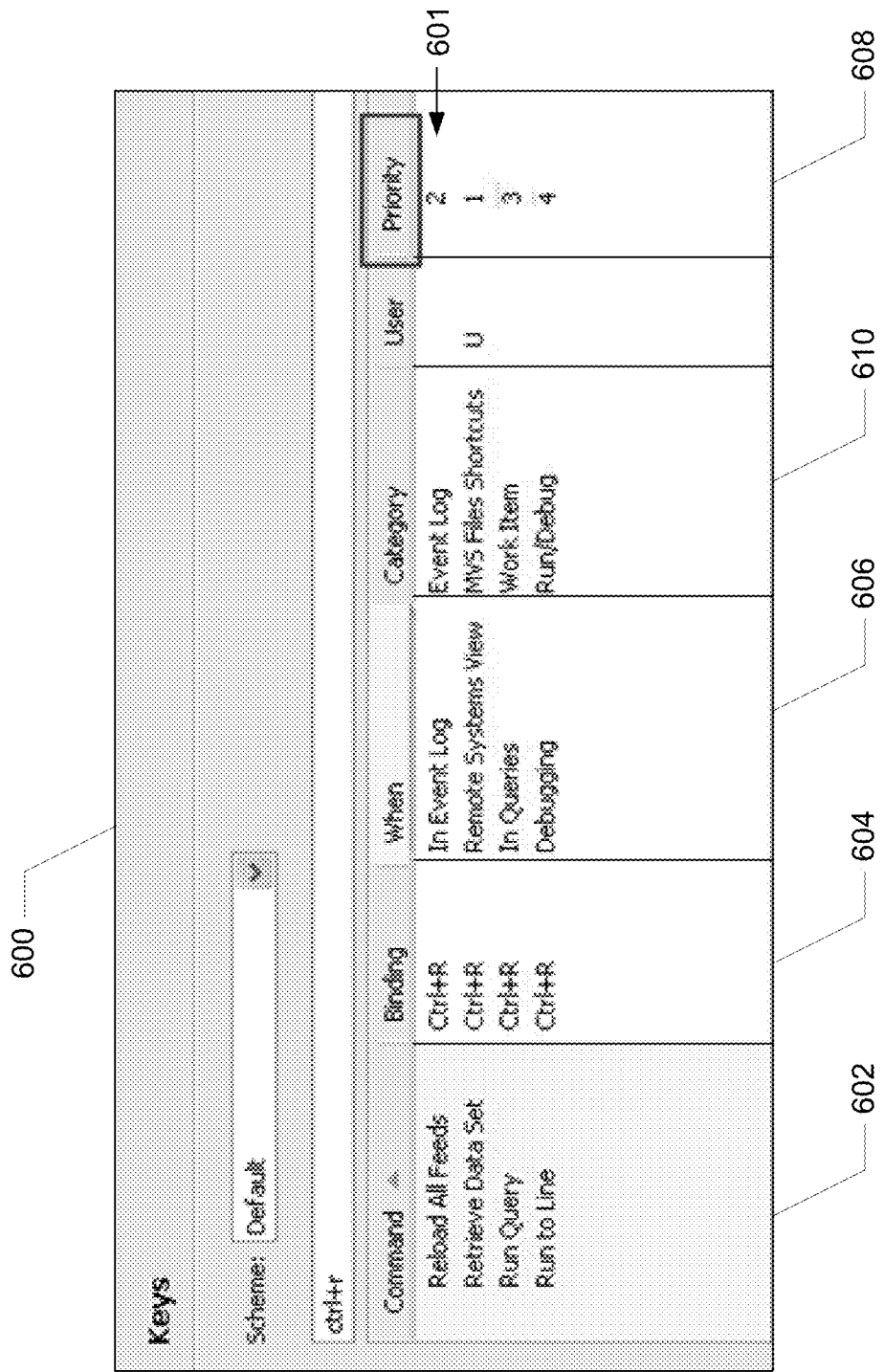
FIG. 6 is a diagram illustrating an exemplary shortcut key menu using the Eclipse preference dialog as an example in which the shortcut key component appends to the Eclipse Keys preference dialog a "Priority" attribute.

FIG. 6 is a diagram illustrating an exemplary shortcut key menu using the Eclipse preference dialog as an example in which the shortcut key component 26 appends to the Eclipse Keys preference dialog a "Priority" attribute. The shortcut key menu 600 allows the user to not only specify the shortcut key bindings, but also to specify the priority (i.e., ranking) of the value/importance of these functions to the user. In this example, the shortcut key menu 600 displays records 601 of the shortcut key bindings comprising all the functions 602 (or commands) currently bound or mapped to the shortcut key 604, the window 606 that defines the shortcut key binding, and a priority attribute 608 for which the user may assign a value. The shortcut key menu may also display a category 610 for the shortcut key binding.

Once the initial setup is complete, the user will be able to invoke the dynamically generated shortcut key menu 600 by any variety of methods, such as accessing a preference menu from the shortcut key component 26 or by pressing a designated key. Once invoked the shortcut key menu 600 opens and displays all the functions mapped to that shortcut key and the order established by the user for invoking those functions.

In the Eclipse, the shortcut key menu 600 further includes a filter field for the user to enter a particular shortcut key (e.g. entering "CTRL+R" in FIG. 6), resulting in the shortcut key menu 600 showing all the functions that are currently mapped to this specific shortcut key. Using shortcut key menu 600 dialog, the user is able to rank these functions in terms of their usefulness to a user, and how one wants to access them via the shortcut key pop-up menu discussed below.

Referring again to FIG. 5, once the shortcut key menu is displayed, the shortcut key component 26 receives a user entered selection of a priority for each of the functions to create a ranked menu of functions for the shortcut key (block 502). In one embodiment, the shortcut key component 26 may receive a user entered value for each of the priority attributes (FIG. 6). In another embodiment, the shortcut key component 26 may receive the priority in response to the user arranging the display order of the shortcut key binding records 601 through dragging and dropping. In one embodiment, the shortcut key component 26 may initially assign default values for the priority attributes, e.g., based on the original order of the list, that the user may then modify.

The user may close the shortcut key menu by anyone of a variety of mechanisms, such as hitting the ESC key, for example. Even though the shortcut menu closes, the shortcut key component operates in the background listening for user entered shortcut keys.

Referring again to FIG. 5, during operation of the computer 4, the shortcut key component 26 responds to detecting an entering of the shortcut key via a keyboard by a user by selectively invoking one of functions listed in the shortcut key menu, regardless of which window is currently active, based on the priority of the functions and a number of times the shortcut key is entered (block 504).

According to the exemplary embodiment, the shortcut key component 26 offers the user a variety of ways to invoke the functions bound to a particular shortcut key during operation of the computer 4. For example, according to a first embodiment, in response to detecting that the user pressed the shortcut key once, the shortcut key component 26 may invoke the function bound to the shortcut key as defined in the currently active window.

According to a second embodiment, in response to detecting that the user pressed and held down the shortcut key for a predetermined duration (e.g., 600 ms), the shortcut key component 26 invokes a shortcut key pop-up menu showing all the functions bound to the entered shortcut key across the different applications 16 for user selection. The user may then navigate down the lists and select one of the functions to invoke using a mouse click or by using a combination of Up, down and Enter keys on keyboard, all without requiring the user to switch working context.

Figure 7:
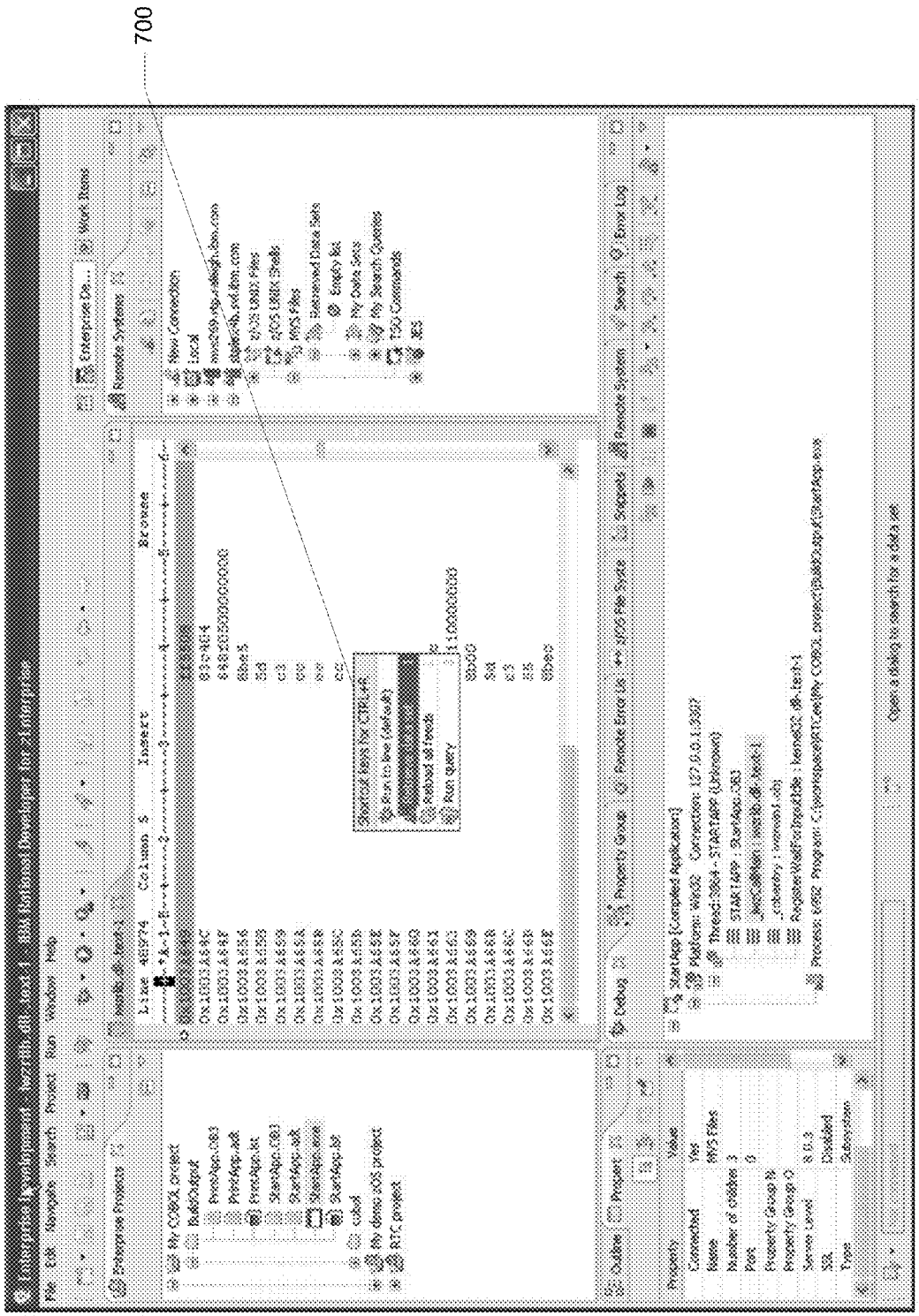

According to a third embodiment, in response to detecting that the user pressed the shortcut key twice in succession, the shortcut key component 26 may invoke a function listed in the shortcut key menu having the highest priority or rank, but without displaying the shortcut key menu. Referring to FIG. 7 for example, the user may invoke the top ranked function for "CTRL+R", "retrieve data set", without first displaying the shortcut key pop-up menu by pressing the shortcut key twice in quick succession.

According to a fourth embodiment, in response to detecting that the user pressed the shortcut key multiple times in succession, the shortcut key component 26 may invoke a function listed in the shortcut key menu having a priority or rank equal to a number of times the shortcut key was pressed. For example, pressing the shortcut key four times will result in the function ranked fourth on the list to be invoked. The function may also be invoked without display of the shortcut key menu.

FIG. 7 is a diagram illustrating an exemplary shortcut pop-up key menu displayed in response to the user holding down the "CTRL+R" shortcut key in the Eclipse Workbench example. In response to detecting that the "CTRL+R" shortcut key was held down for the predetermined duration, the shortcut key component 26 displays the shortcut pop-up menu 700 showing the functions mapped to the shortcut key ""CTRL+R" in the various views in the Eclipse Workbench. In the example shown, the three functions are listed with the first, being a default and the second listed function is shown highlighted and selected by the user.

Methods and systems for enabling a user to invoke a function via a shortcut key in a multi-window computing environment have been disclosed. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium that may include, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, partly on the user's computer and partly on a remote computer or entirely on the remote computer or server.

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for enabling a user to invoke a function via a shortcut key in a multi-window computing environment by a software component executing on a processor of a computer, comprising:

displaying a single shortcut key menu that lists bindings of functions to shortcut keys in different windows of applications, including an active application and non-active applications, for both user selection and modification;

receiving, through the single shortcut key menu, a user entered selection of a shortcut key binding and a user modification of a priority for each of the functions to create a ranked menu of functions for the shortcut keys;

closing the single shortcut key menu once the user's modification of the single shortcut key menu is complete; and responsive to detecting an entering of the shortcut key via a keyboard by a user during operation of the computer, selectively invoking one of functions listed in the single shortcut key menu among all the shortcut keys for the different windows of applications, including the active application and the non-active applications, regardless of which window is currently active based on the priority of the functions and a number of times the shortcut key is entered by:

in response to detecting that the user pressed the shortcut key once, invoking the function bound to the shortcut key as defined in the currently active window without displaying the single shortcut key menu;

in response to detecting that the user pressed the shortcut key twice in succession, invoking the function listed in the shortcut key menu having the highest priority without displaying the single shortcut key menu; and in response to detecting that the user pressed and held down the shortcut key for a predetermined duration, displaying the single shortcut key menu showing all the functions bound to the entered shortcut key across the different windows of the applications, including the active application and the non-active applications, for user selection.

2. The method of claim 1, wherein the single shortcut key menu displays shortcut key bindings, each comprising a function bound to the shortcut key, a window that defines a shortcut key binding, and a priority attribute.

3. The method of claim 1, wherein receiving a user entered selection of a priority comprises at least one of receiving a user entered value for each of the priority attributes, and receiving the priority in response to the user arranging a display order of the shortcut key bindings through dragging and dropping.

4. A non-transitory computer-readable medium storing an executable software product containing program instructions which when executed by a processor of a computer enable a user to invoke a function via a shortcut key in a multi-window computing environment, the program instructions for:

displaying a single shortcut key menu that lists bindings of functions to shortcut keys in different windows of applications, including an active application and non-active applications, for both user selection and modification;

receiving, through the single shortcut key menu, a user entered selection of a shortcut key binding and a user modification of a priority for each of the functions to create a ranked menu of functions for the shortcut keys;

closing the single shortcut key menu once the user's modification of the single shortcut key menu is complete; and responsive to detecting an entering of the shortcut key via a keyboard by a user during operation of the computer, selectively invoking one of functions listed in the single shortcut key menu among all the shortcut keys for the different windows of applications, including the active application and the non-active applications, regardless of which window is currently active based on the priority of the functions and a number of times the shortcut key is entered by:

in response to detecting that the user pressed the shortcut key once, invoking the function bound to the shortcut key as defined in the currently active window without displaying the single shortcut key menu;

in response to detecting that the user pressed the shortcut key twice in succession, invoking the function listed in the shortcut key menu having the highest priority without displaying the single shortcut key menu; and in response to detecting that the user pressed and held down the shortcut key for a predetermined duration, displaying the single shortcut key menu showing all the functions bound to the entered shortcut key across the different windows of the applications, including the active application and the non-active applications, for user selection.

5. The non-transitory computer-readable medium of claim 4, wherein the single shortcut key menu displays shortcut key bindings, each comprising a function bound to the shortcut key, a window that defines the shortcut key binding, and a priority attribute.

6. The non-transitory computer-readable medium of claim 5, wherein receiving a user entered selection of a priority comprises at least one of receiving a user entered value for each of the priority attributes, and receiving the priority in response to the user arranging a display order of the shortcut key bindings through dragging and dropping.

7. A computer, comprising:
a memory;
a display screen;
a processor coupled to the memory; and
a software component executed by the processor that is configured to:
display a single shortcut key menu that lists bindings of functions to shortcut keys in different windows of applications, including an active application and non-active applications, for both user selection and modification;
receive, through the single shortcut key menu, a user entered selection of a shortcut key binding and a user modification of a priority for each of the functions to create a ranked menu of functions for the shortcut keys;
close the single shortcut key menu once the user's modification of the single shortcut key menu is complete; and
responsive to detecting an entering of the shortcut key via a keyboard by a user during operation of the computer, selectively invoke one of functions listed in the single shortcut key menu among all the shortcut keys for the different windows of applications, including the active application and the non-active applications, regardless of which window is currently active based on the priority of the functions and a number of times the shortcut key is entered by:

in response to detecting that the user pressed the shortcut key once, invoke the function bound to the shortcut key as defined in the currently active window without displaying the single shortcut key menu;

in response to detecting that the user pressed the shortcut key twice in succession, invoke the function listed in the shortcut key menu having the highest priority without displaying the single shortcut key menu; and in response to detecting that the user pressed and held down the shortcut key for a predetermined duration, display the single shortcut key menu showing all the functions bound to the entered shortcut key across the different windows of the applications, including the active application and the non-active applications, for user selection.

8. The computer of claim 7, wherein the software component receives at least one of a user entered value for each of the priority attributes, and receives the priority in response to the user arranging a display order of the shortcut key bindings through dragging and dropping.

* * * * *